(12) United States Patent
Kastelic, Jr.

(10) Patent No.: US 10,849,271 B2
(45) Date of Patent: Dec. 1, 2020

(54) ATTACHMENT FOR STEERING A ZERO-TURN RADIUS VEHICLE

(71) Applicant: Joseph John Kastelic, Jr., Aurora, OH (US)

(72) Inventor: Joseph John Kastelic, Jr., Aurora, OH (US)

( * ) Notice: Subject to any disclaimer, the term of this patent is extended or adjusted under 35 U.S.C. 154(b) by 106 days.

(21) Appl. No.: 16/270,213

(22) Filed: Feb. 7, 2019

(65) Prior Publication Data
US 2019/0239431 A1 Aug. 8, 2019

Related U.S. Application Data

(60) Provisional application No. 62/627,341, filed on Feb. 7, 2018.

(51) Int. Cl.
| | | |
|---|---|---|
| *A01D 34/82* | (2006.01) |
| *B62D 1/00* | (2006.01) |
| *A01D 101/00* | (2006.01) |
| *A01D 34/64* | (2006.01) |

(52) U.S. Cl.
CPC ............. *A01D 34/824* (2013.01); *B62D 1/00* (2013.01); *A01D 34/64* (2013.01); *A01D 2101/00* (2013.01)

(58) Field of Classification Search
CPC ... B62D 1/00; B62D 1/02; B62D 1/12; B62D 1/14; B62D 1/22; A01D 2101/00; A01D 34/64; A01D 34/82; A01D 34/824; B62K 21/12; B62K 21/125; Y10T 74/2078; Y10T 74/20822; Y10T 74/20828

USPC ........................................................ 180/332
See application file for complete search history.

(56) References Cited

U.S. PATENT DOCUMENTS

| | | | | |
|---|---|---|---|---|
| 586,678 | A * | 7/1897 | Walsh ................... | B62K 21/26 74/551.9 |
| 1,448,921 | A * | 3/1923 | Ershkowitz ............ | B62K 21/16 74/551.8 |
| 1,540,608 | A | 6/1925 | Dawson et al. | |
| 3,063,304 | A | 11/1962 | Manning | |
| 3,547,458 | A | 12/1970 | Price | |
| 4,476,643 | A * | 10/1984 | Hilchey ............... | B62D 51/004 180/19.3 |
| 4,872,697 | A * | 10/1989 | Berkowitz .............. | B62B 5/067 280/304.5 |
| 5,644,903 | A | 7/1997 | Davis, Jr. | |
| 6,138,069 | A | 10/2000 | Ellertson et al. | |
| 7,143,662 | B2 * | 12/2006 | Hobson, Jr. ............ | B62K 11/14 74/551.3 |
| 7,426,976 | B2 | 9/2008 | Edlin | |
| D890,046 | S * | 7/2020 | Kastelic ....................... | D12/177 |

* cited by examiner

*Primary Examiner* — Laura Freedman
(74) *Attorney, Agent, or Firm* — Tucker Ellis LLP

(57) ABSTRACT

The innovation described herein generally pertains to a system and method related to a handle attachment device that can allow a user to operate the control lever arms of a zero turn radius vehicle with one hand. The handle attachment device can be configured to attach to control lever arms on a zero turn vehicle. The arrangement of the handle attachment device allows a user to grip the handle attachment device and steer the zero turn vehicle with one hand.

16 Claims, 10 Drawing Sheets

ATTACHMENT FOR STEERING A ZERO-TURN RADIUS VEHICLE

CROSS-REFERENCE TO RELATED APPLICATIONS

This application claims the benefit of U.S. Provisional Application Ser. No. 62/627,341, filed Feb. 7, 2018 and entitled ATTACHMENT FOR STEERING A ZERO-TURN RADIUS VEHICLE. The entirety of the aforementioned application is incorporated herein by reference.

TECHNICAL FIELD

In general, the present innovation relates to a handle attachment for a zero-turn radius vehicle, and more particularly to a handle attachment that allows one-handed operation of a lever-controlled vehicle.

BACKGROUND

Zero turn vehicles such as zero turn lawnmowers are used due to their ability to make turns with a minimal or zero turn radius. These vehicles are often controlled by two control lever arms. These control lever arms require a driver to use both hands to steer or control the vehicle. In certain situations, a driver may only have one hand available to operate the control lever arms. Accordingly, a device and method for operating a zero turn vehicle with one hand is needed.

SUMMARY

In accordance with an embodiment of the present innovation, disclosed is a handle attachment device for operating the control lever arms of a zero turn vehicle. The handle attachment device includes a handle having a first end, a grip portion, and a second end opposite the first end. The grip portion is in between the first end and the second end, and a longitudinal axis extends between the first end and the second end. The handle attachment device further includes a first coupler attached to the first end. The first coupler includes a first hinged end and a first connecting end. The first hinged end is coupled to the first end of the handle such that the first coupler pivots about a first pivot axis perpendicular to the longitudinal axis. The handle attachment device further includes a second coupler attached to the second end. The second coupler includes a second hinged end and a second connecting end. The second hinged end is coupled to the second end of the handle such that the second coupler pivots about a second pivot axis perpendicular to the longitudinal axis. A first clamp portion is attached to the first coupler at the first connecting end. The first clamp portion is rotatable about a first rotation axis that extends through a center of the first coupler from the first connecting end to the first hinged end. The first clamp portion is configured to attach to a first control lever arm of a vehicle. A second clamp portion is attached to the second coupler at the second connecting end. The second clamp portion is rotatable about a second rotation axis that extends through a center of the second coupler from the second connecting end to the second hinged end. The second clamp portion is configured to attach to a second control lever arm of a vehicle.

These and other objects of this innovation will be evident when viewed in light of the drawings, detailed description and appended claims.

BRIEF DESCRIPTION OF THE DRAWINGS

The innovation may take physical form in certain parts and arrangements of parts, a preferred embodiment of which will be described in detail in the specification and illustrated in the accompanying drawings which form a part hereof, and wherein.

DETAILED DESCRIPTION

Figure 1:
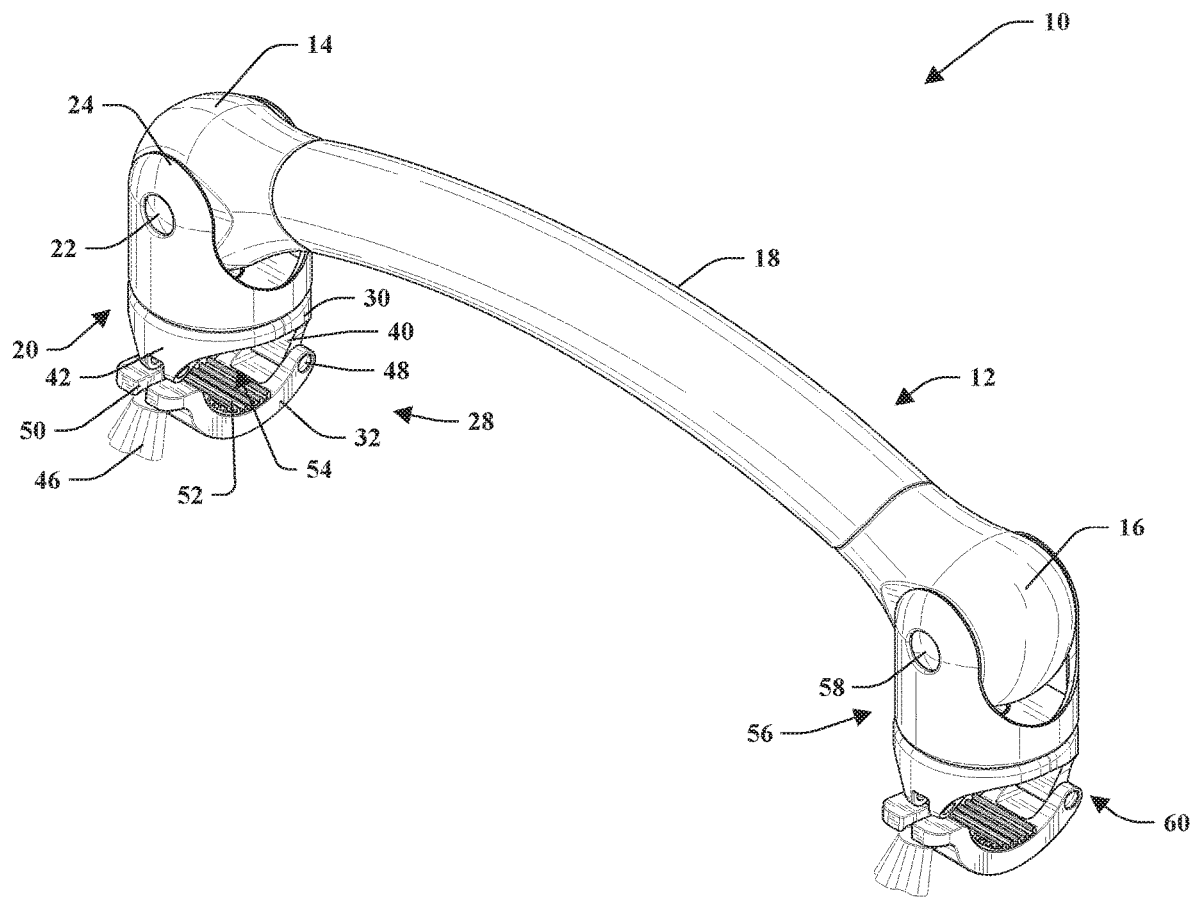
FIG. 1 is a perspective view of an exemplary handle attachment device.

Embodiments of the innovation relate to methods and systems that relate to a handle attachment device that can allow a user to operate the control lever arms of a zero turn radius vehicle with one hand. The handle attachment device can be configured to attach to control lever arms on a zero turn vehicle. The arrangement of the handle attachment device allows a user to grip the handle attachment device and steer the zero turn vehicle with one hand.

The subject can be used with any suitable vehicle operated or steered by levers. Such vehicles can include zero turn vehicles such as zero turn lawn mowers, zero turn wheelchairs, zero turn utility vehicles, zero turn plows, among others.

"Zero turn vehicle" as used herein including any other formatives of these words will refer to any vehicle that can be steered or controlled by the use of levers.

With reference to the drawings, like reference numerals designate identical or corresponding parts throughout the several views. However, the inclusion of like elements in different views does not mean a given embodiment necessarily includes such elements or that all embodiments of the innovation include such elements. The examples and figures are illustrative only and not meant to limit the innovation, which is measured by the scope and spirit of the claims.

FIGS. 1-6 illustrate an embodiment of a handle attachment device 10. The handle attachment device 10 can be configured to attach to control lever arms on a zero turn vehicle to allow a user to steer the zero turn vehicle with one hand. The handle attachment device 10 includes a handle 12 extending along a longitudinal axis, and having a first end 14 and a second end 16. The handle 12 can be curved to better accommodate a user's hand grip. In certain embodiments, the handle can include a grip 18 covering a portion of the handle 12. The grip 18 can be made of rubber. The portion of the handle 12 covered by the grip 18 can have a smaller cross-sectional diameter than the first end 14 and second end 16. In certain embodiments, the first end 14 and the second end 16 have a generally bulbous shape, and terminate at a rounded end. It should be appreciated that the handle 12 can be constructed from material chosen using sound engineering judgment. By way of example and not limitation, the handle 12 can be constructed from plastic or metal.

At the first end 14 of the handle 12, a first coupler 20 is pivotally attached to the handle 12 by a first pin 22. The first coupler 20 has a lower circular face 38 at a bottom connecting end, and two opposing legs 24 and 26 at a hinged end. The two opposing legs 24 and 26 each have an aperture. The opposing legs 24 and 26 are positioned such that at least a portion of the inside faces of the opposing legs 24 and 26 make contact with opposing lateral sides of the first end 14 of the handle 12. The apertures on the opposing legs 24 and 26 are aligned with an aperture extending through the first end 14 of the handle 12. The first pin 22 extends through each of the aperture on the leg 24, the aperture extending through the first end 14 of the handle 12, and the aperture on the opposing leg 26. In this arrangement, the first coupler 20 is able to pivot about the first pin 22, and the first end 14 of the handle 12. In other words, the first coupler 20 can pivot about an axis perpendicular to the longitudinal axis of the handle 12.

The handle attachment device 10 further includes a clamp portion 28 that is rotatably coupled with the first coupler 20 at the lower circular face 38 end of the first coupler 20. The first clamp portion 28 is rotatable about a center axis of the first coupler 20, and is also movable with the first coupler 20 such that the first clamp portion can pivot about the first end 14 of the handle 12 along with the first coupler 20. The first clamp portion 28 includes a clamp connector 30 and a lower jaw 32. The clamp connector 30 is rotatably coupled to the lower circular face 38 of the first coupler 20 by way of an axle 34. The axle 34 extends vertically through an upper circular face 36 of the clamp connector 30 and the lower circular face 38 of the first coupler 20. The first clamp portion 28 can rotate about the axis of the axle 34. The clamp connector 30 further includes a hinge leg 40 that extends downwards from a first end of the upper circular face 36 and a bolt leg 42 that extends downwards from a second end of the upper circular face 36, opposite of the first end. In an embodiment, the bolt leg 42 is shorter than the hinge leg 40. A T-bolt 44 is hingedly attached to the bolt leg 42 such that the T-bolt 44 can pivot about the end of the bolt leg 42. A thumb screw 46 can be inserted onto the T-bolt 44. The thumb screw 46 can have corresponding threads on the inside of the thumb screw 46 such that the thumb screw 46 can screw on or off of the T-bolt 44.

Figure 7:
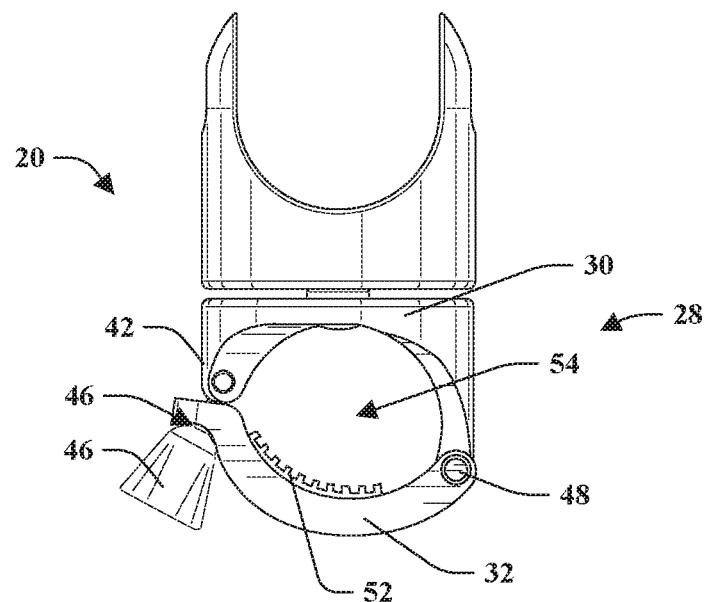
FIG. 7 is an enlarged view of a handle attachment device's clamp portion in an open position.
Figure 8:
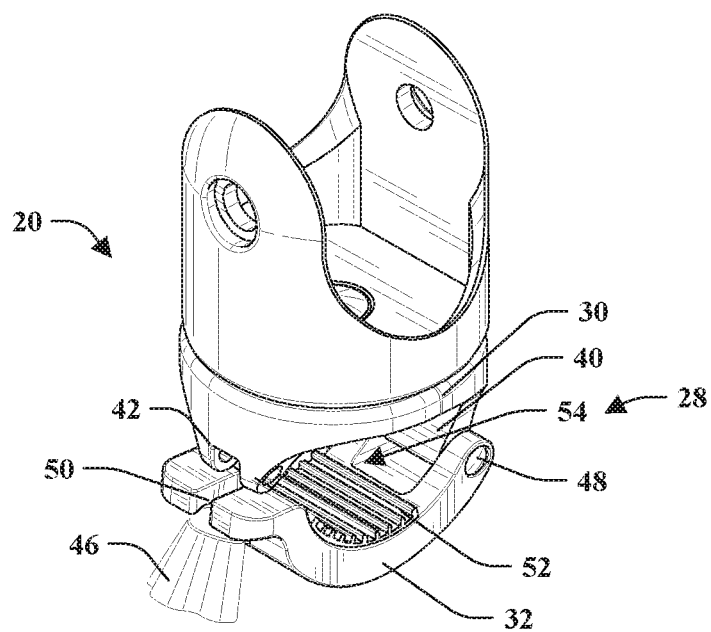
FIG. 8 is an enlarged view of a handle attachment device's clamp portion in a closed position.

The lower jaw 32 connects with the clamp connector 30 at a hinge 48. The hinge 48 extends through a first connecting leg at a first end of the lower jaw 32, the hinge leg 40 of the clamp connector 30, and a second connecting leg at the first end of the lower jaw 32. The hinge 48 connection allows the lower jaw 32 to pivot about the hinge 48. This pivoting action allows a user to manipulate the lower jaw 32 into an open position as depicted in FIG. 7, or a closed position as shown in FIG. 8. The lower jaw 32 has a notch 50 in a second end of the lower jaw 32, opposite the hinged end. The notch 50 is sized to receive the T-bolt 44. When the T-bolt 44 is pivoted into the notch 50, the thumb screw 46 can be screwed further onto the T-bolt 44 until the thumb screw 46 contacts the notch 50 end of the lower jaw 32. Further tightening of the thumb screw 46 applies a force to the lower jaw 32, which holds the lower jaw 32 in the closed position as shown in FIG. 8. It should be appreciated that other methods of holding the lower jaw 32 in the closed position may be used, such as a pin and clip, screws, latches, among others. The lower jaw 32 can further include a grip insert 52 on an upper face of the lower jaw 32. In an embodiment, the grip insert 52 is ribbed and made of rubber. It should be appreciated that the grip insert 52 can be removable and made of any material that provides additional grip. The lower jaw 32 and the clamp connector 30 connect to form a clamp opening 54. The clamp opening 54 can be adjusted in size by tightening or loosening the thumb screw 46 on the T-bolt 44.

The handle attachment device 10 further includes a second coupler 56 pivotally attached to the second end 16 handle 12 by a second pin 58. A second clamp portion 60 is rotatably coupled with the second coupler 56. The second coupler 56 and the second clamp portion 60 include the same components as the first coupler 20 and the first clamp portion 28, and are arranged in the same manner. Therefore, the previous description of the first coupler 20 and the first clamp portion 28 apply to the second coupler 56 and the second clamp portion 60. In certain embodiments, the couplers 20 and 56, and the clamp portions 28 and 60 can be made from plastic or metal, including but not limited to, cast steel or stainless steel.

Figure 2:
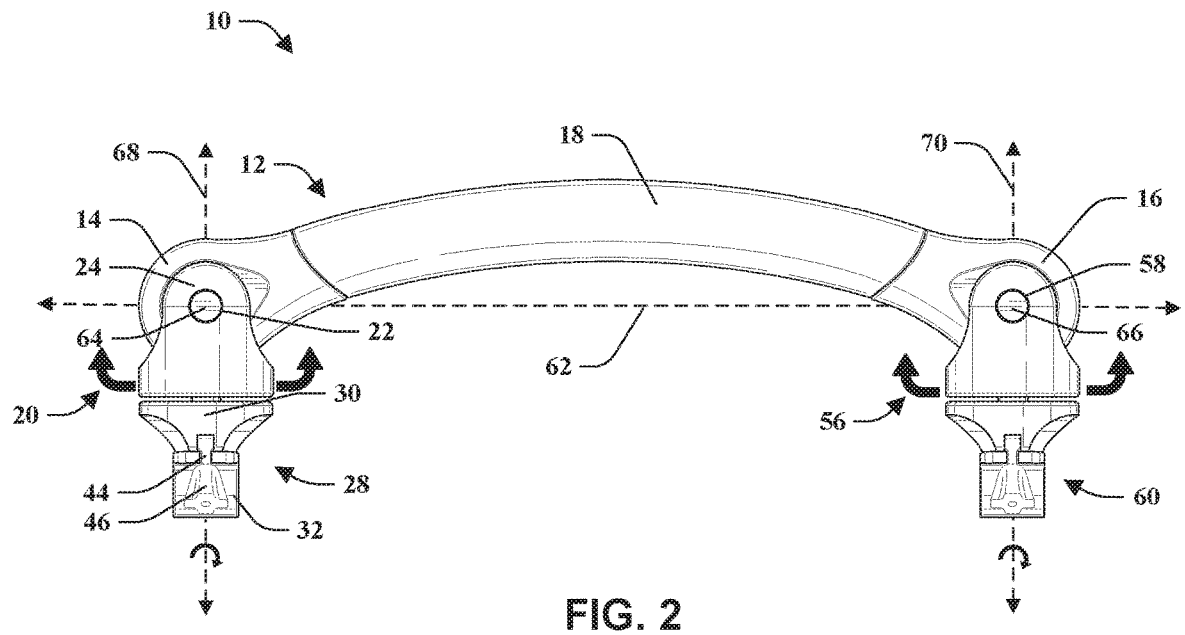
FIG. 2 is a front view of the handle attachment device of FIG. 1.
Figure 3:
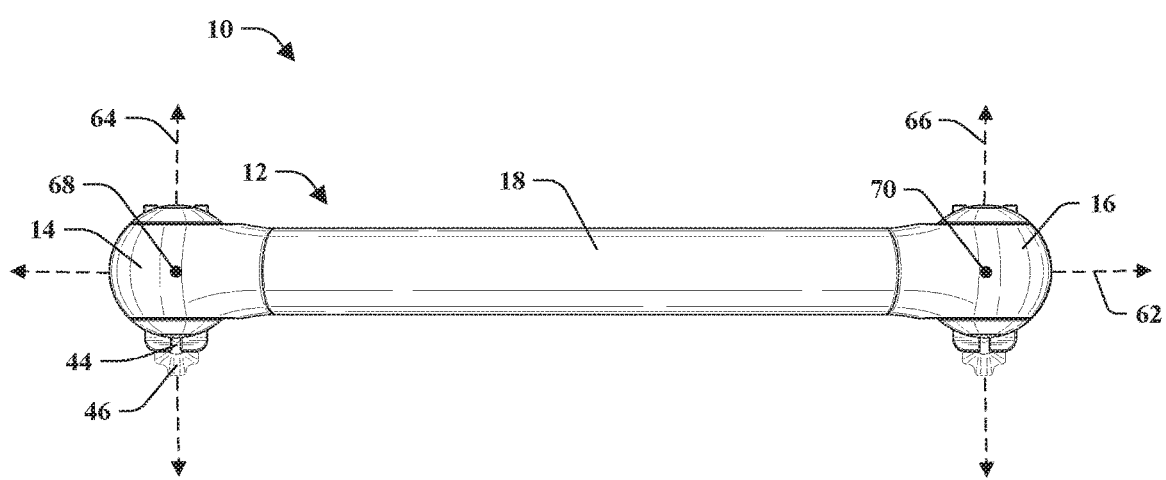
FIG. 3 is a top view of the handle attachment device of FIG. 1.
Figure 4:
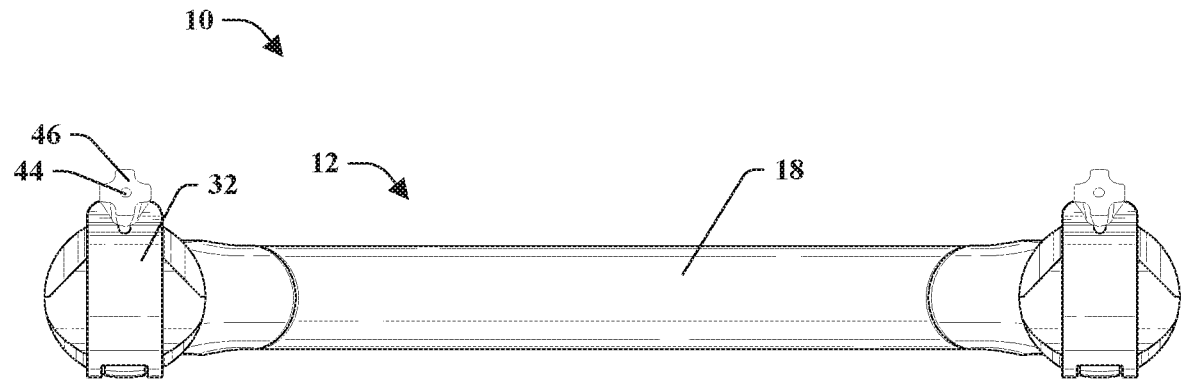
FIG. 4 is a bottom view of the handle attachment device of FIG. 1.
Figure 5:
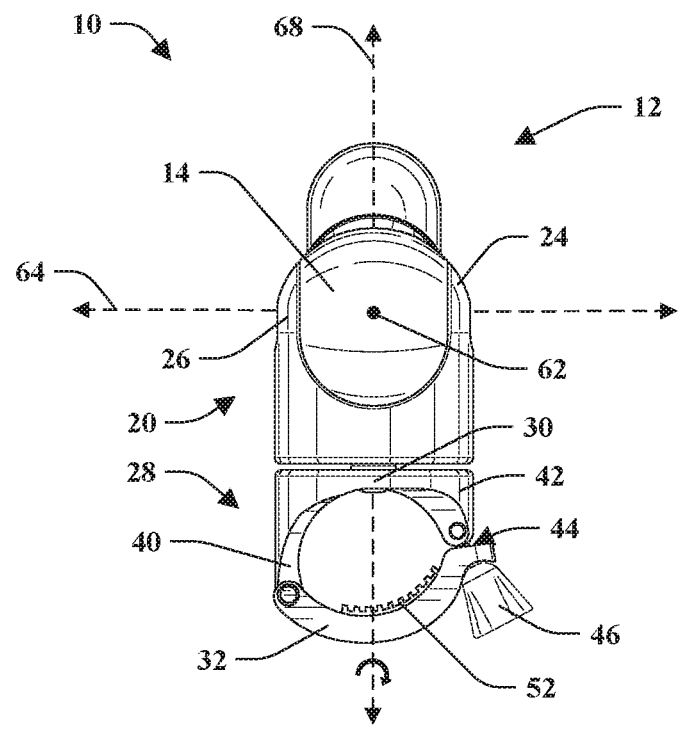
FIG. 5 is an end view of the handle attachment device of FIG. 1.
Figure 6:
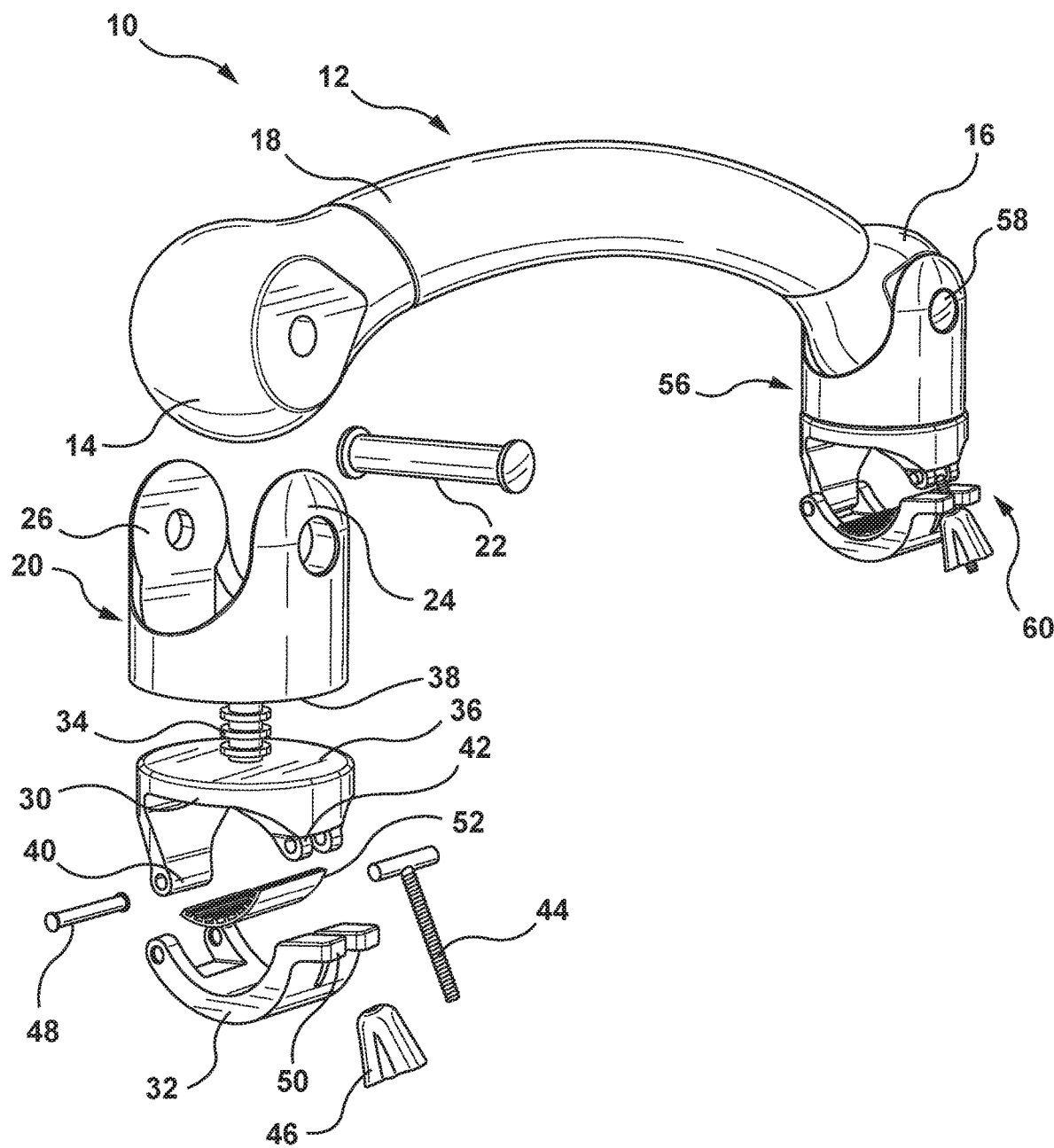
FIG. 6 is an exploded view of the handle attachment device of FIG. 1.

The handle attachment device 10 can pivot on multiple axes as depicted in FIGS. 2-3, and 5. A longitudinal axis 62 extends between the first end 14 and the second end 16 of the handle 18. The first coupler 20 includes a first hinged end and a first connecting end. The first hinged end is coupled to the first end 14 of the handle 18 such that the first coupler 20 pivots about a first pivot axis 64 perpendicular to the longitudinal axis 62. The second coupler 56 includes a second hinged end and a second connecting end. The second hinged end is coupled to the second end 16 of the handle 18 such that the second coupler 56 pivots about a second pivot axis 66 perpendicular to the longitudinal axis 62. The first clamp portion 28 is attached to the first coupler 20 at the first connecting end. The first clamp portion 28 is rotatable about a first rotation axis 68 that extends through a center of the first coupler 20 from the first connecting end to the first hinged end. The first clamp portion 28 is configured to attach to a first control lever arm of a vehicle. The second clamp portion 60 is attached to the second coupler 56 at the second connecting end. The second clamp portion 60 is rotatable about a second rotation axis 70 that extends through a center of the second coupler 56 from the second connecting end to the second hinged end. The second clamp portion 60 is configured to attach to a first control lever arm of a vehicle.

It should be appreciated that the handle 12 can be coupled to the control lever arms of a vehicle using other methods. For example, rather than a clamp portion as described herein, a rotatable handle coupler can have a sleeve that slides on and off the control arms, or apertures that secure to the control arms with a pin. A rotatable handle coupler can also be secured to the control arms using fastening means such as bolts, screws, welds, rivets, straps, among others. In certain embodiments, a rotatable handle coupler can be integrated into the lever arms.

Figure 9:
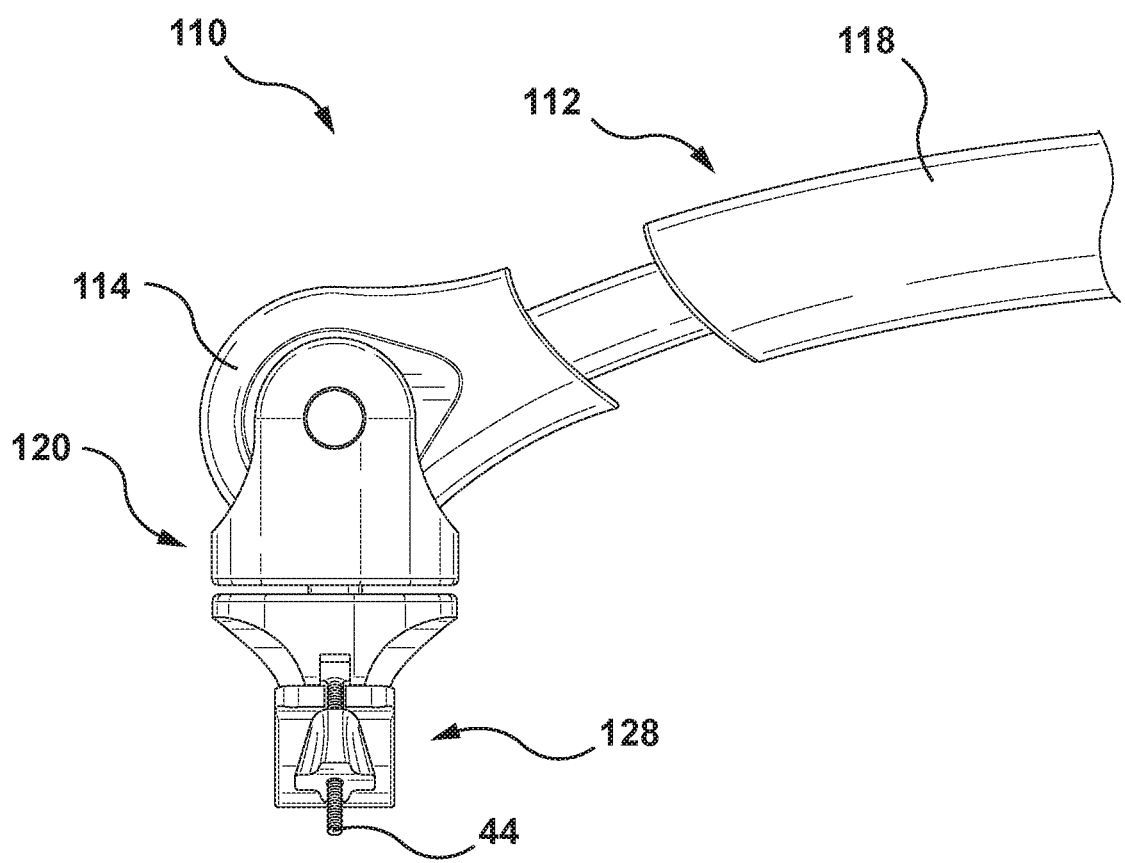
FIG. 9 is an enlarged view of one end of an exemplary handle attachment device having a telescoping handle.

Turning now to FIG. 9 another exemplary embodiment of a handle attachment device is shown at 110. The handle attachment device 110 is substantially the same as the above-referenced handle attachment device 10, and consequently the same reference numerals but indexed by 100 are used to denote structures corresponding to similar structures in the handle attachment device. In addition, the foregoing description of the handle attachment device 10 is equally applicable to the handle attachment device 110 except as noted below and depicted in the figures.

Handle attachment device 110 includes a handle 112 that can extend outwards and retract inwards in a telescoping action with respect to at least one of the first end 114 or the second end (not shown). In this manner, the handle 112 can increase or decrease in length along its longitudinal axis while in use. In other embodiments, the clamp portions 128 can extend downwards and retract upwards in a telescoping action with respect to the couplers 120. In this manner, the clamp portions 128 can be moved further away from, or closer to, the couplers 120.

Figure 10:
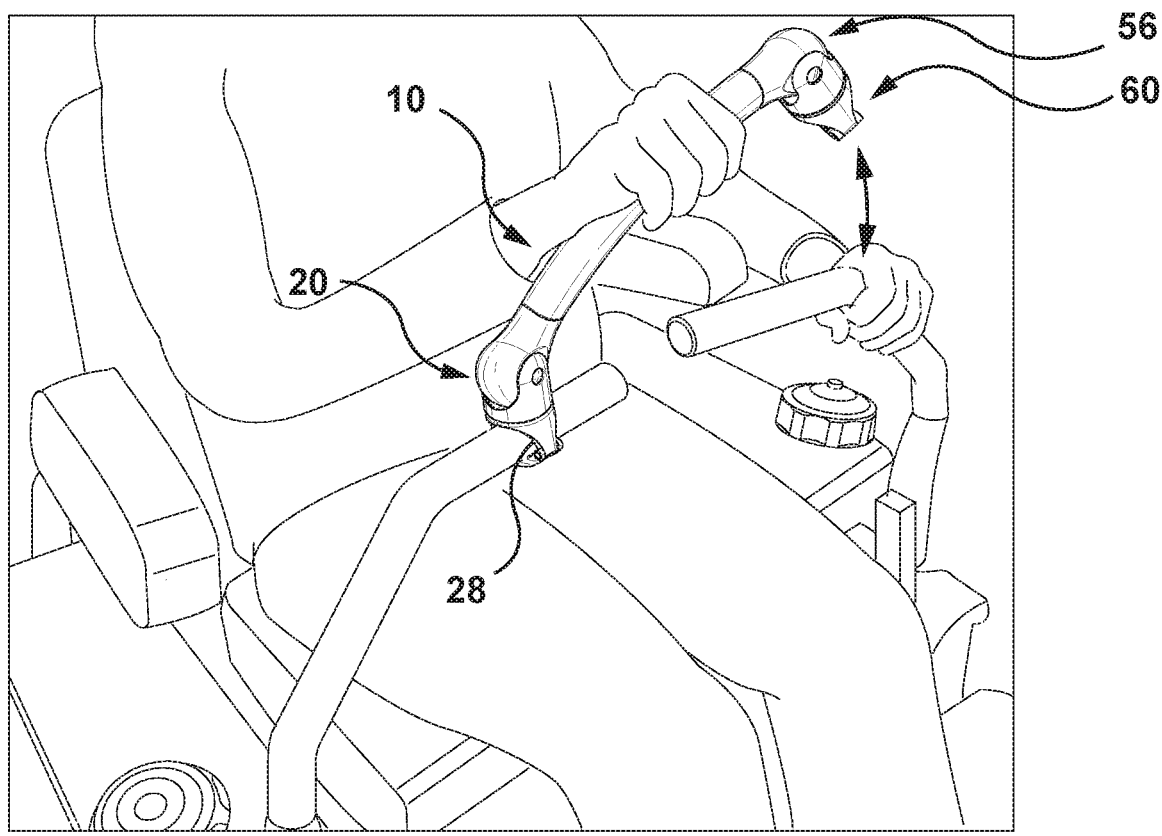
FIG. 10 is an illustration of a user mounting a handle attachment device to steering levers on a zero-turn radius vehicle.
Figure 11:
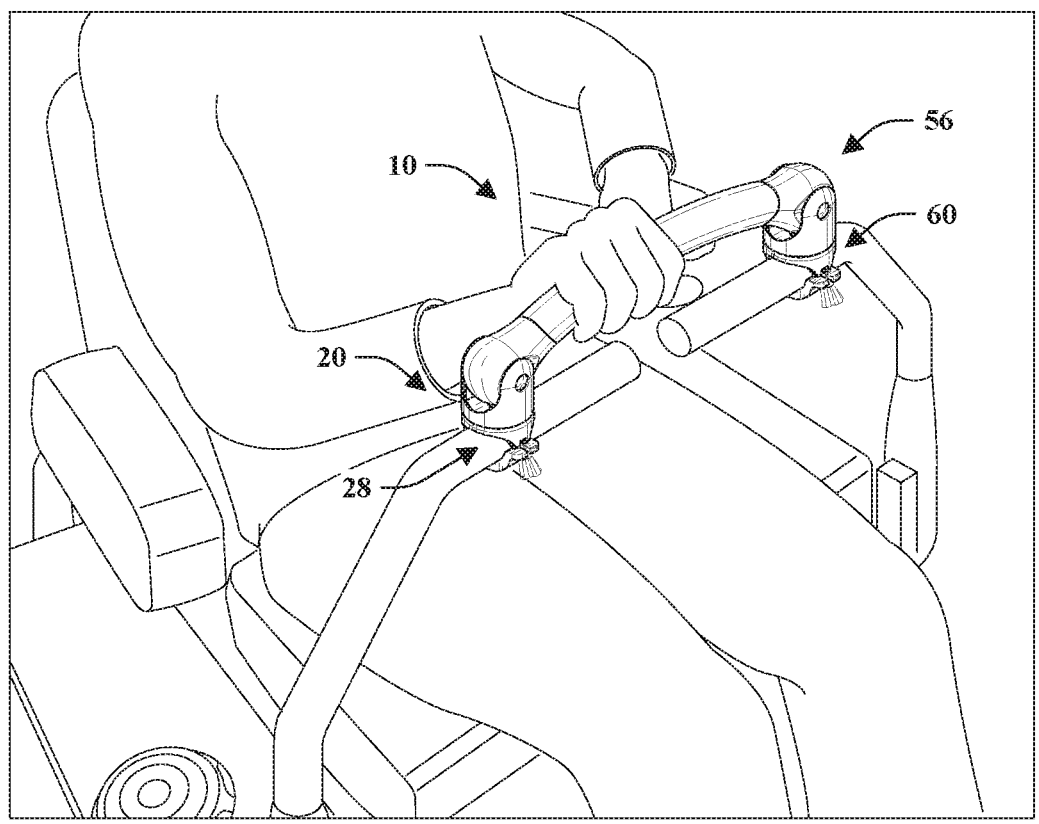
FIG. 11 is an illustration of the handle attachment device mounted to control lever arms on a zero turn radius vehicle.
Figure 12:
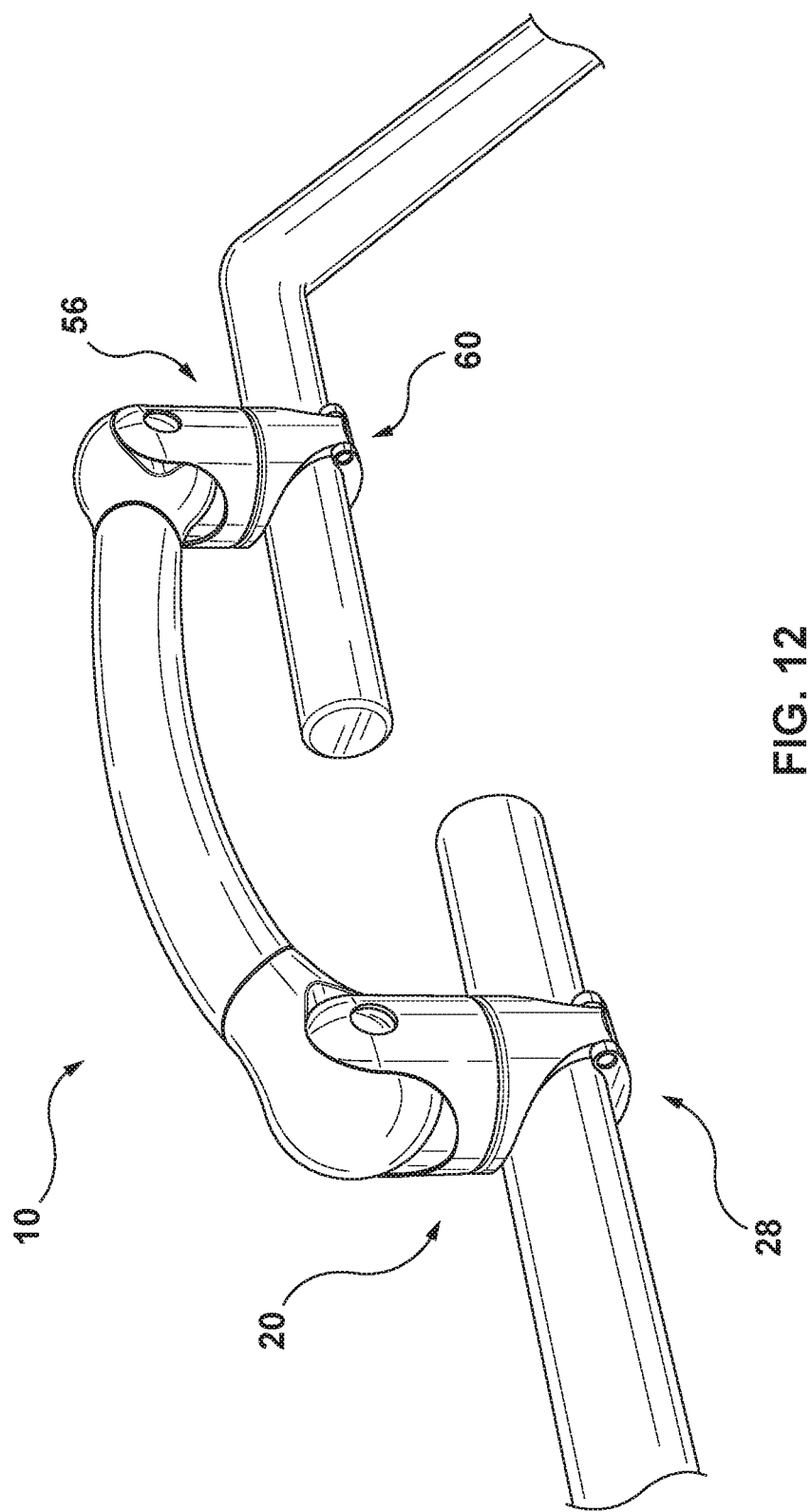
FIG. 12 is an illustration of the handle attachment device mounted to control lever arms on a zero turn radius vehicle.

Turning now to FIGS. 10-12, a user can attach the handle attachment device 10 to control lever arms of a zero turn vehicle such as a zero turn lawn mower. Throughout the description below, it should be appreciated that descriptions of "first" and "second" components are used for clarity. The hand attachment device 10 can be connected in a reverse fashion (first end/second end, or second end/first end), and the handle attachment device 10 would function the same.

While in the open position, the first and second clamp portions 28 and 60 can be attached to the control lever arms of a zero turn vehicle. In FIG. 10, the right control lever arm is inserted into the clamp opening 54 of the first clamp portion 28 and the left control lever arm is inserted into the clamp opening 54 of the second clamp portion 60 while the clamp portions 28 and 60 are in the open position. When the control lever arms are inserted into their respective clamp opening 54 and the user is satisfied with the position of the handle attachment device 10, the user can close the lower jaw 32 on the first clamp portion 28 and the second clamp portion 60. To secure the clamp portions 28 and 60 in the closed position, the user can pivot the T-bolt 44 inwards so that the T-bolt 44 nests in the notch 50 for each clamp portion 28 and 60. After the T-bolt 44 is nested in its respective notch 50, the user can tighten the thumb screw 46 until the thumb screw 46 provides enough upward pressure on the notch 50 end of the lower jaw 32 such that the clamp portions 28 and 60 are secured in the closed position, mounted on the respected control lever arm. The grip insert 52 can provide extra friction on the control arm such that the grip portions 28 and 60 remain tight on the control arms without slipping. The grip insert 52 can also be used to change the diameter of the clamp openings 54. For example, if the diameter of a vehicle's control lever arms is smaller than the diameter of the clamp opening 54, the grip insert 52 can be added to create a tight fit of the clamp portion 28 and 60 on the control level arms. The grip insert 52 can be available in multiple sizes that can account for variations in control lever arm diameters. It should be appreciated that the first and second clamp portions 28 and 60 can be attached to the respective control lever arm one at a time, or simultaneously.

Figure 13:
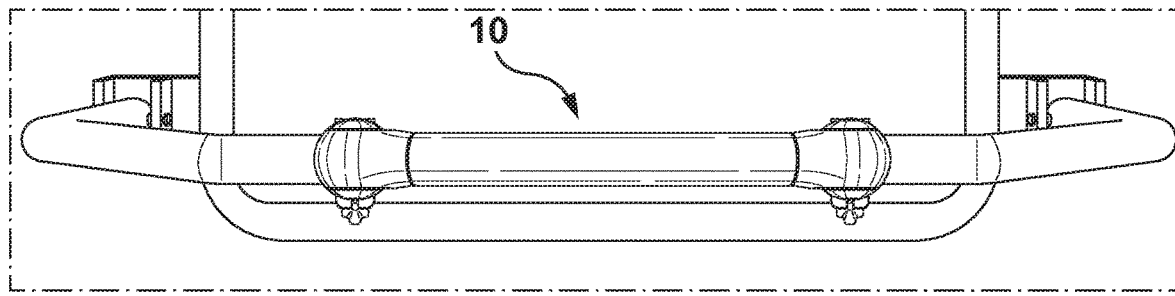
FIG. 13 is an illustration of the handle attachment device mounted to control lever arms on a zero turn radius vehicle, with the levers in a straight position.
Figure 14:
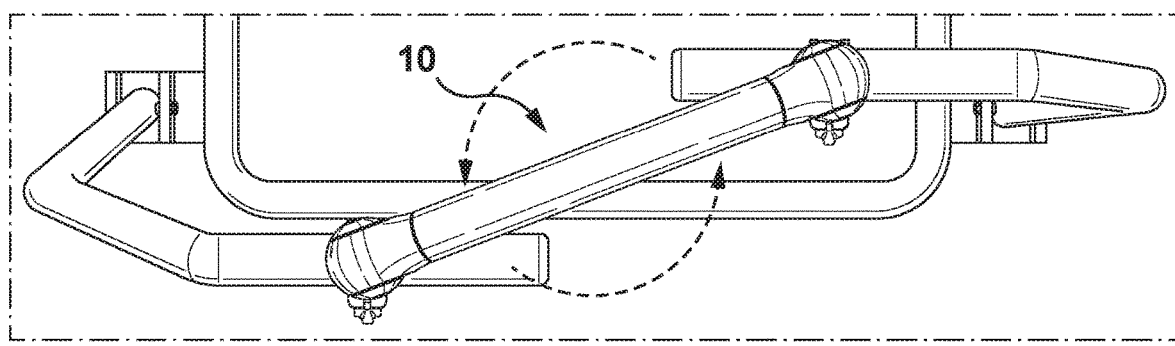
FIG. 14 is an illustration of the handle attachment device mounted to control lever arms on a zero turn radius vehicle, with the levers in a left-turn position.
Figure 15:
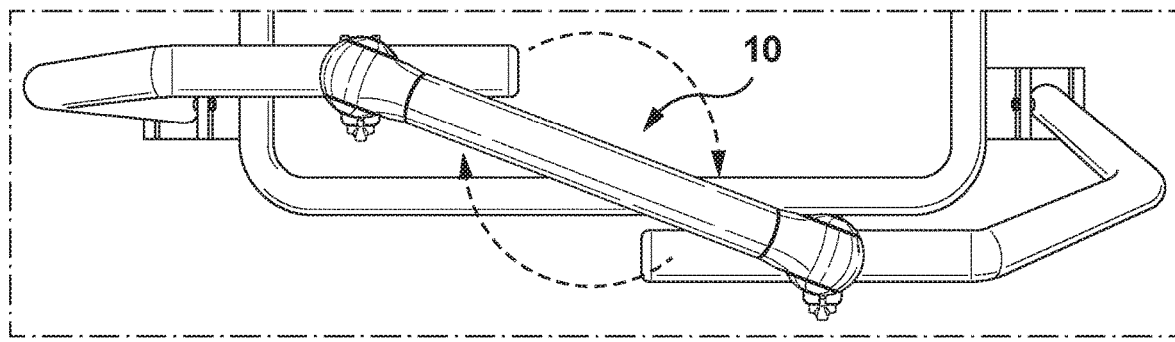
FIG. 15 is an illustration of the handle attachment device mounted to control lever arms on a zero turn radius vehicle, with the levers in a right-turn position.

During operation of a zero turn vehicle, the handle attachment device 10 allows for a user to steer with one hand. FIG. 13 depicts the handle attachment device 10 attached to the control lever arms in a configuration that steers the zero turn vehicle straight. Both control lever arms are even and the handle attachment device 10 is horizontal. FIG. 14 depicts the handle attachment device 10 attached to the control lever arms in a configuration that steers the zero turn vehicle into a left turn. When the user rotates the handle attachment device 10 in a counterclockwise direction, the left control lever arm is pulled backwards, and the right control lever arm is pushed forwards. In this position, the first and second couplers 20 and 56 pivot while the first and second clamp portions 28 and 60 rotate to allow for the control lever arms to move into the position required to make the left turn desired by the user. FIG. 15 depicts the handle attachment device 10 attached to the control lever arms in a configuration that steers the zero turn vehicle into a right turn. When the user rotates the handle attachment device 10 in a clockwise direction, the left control lever arm is pushed forward, and the right control lever arm is pulled backwards. With this action, the first and second couplers 20 and 56 pivot while the first and second clamp portions 28 and 60 rotate to allow for the control lever arms to move into the position required to make the right turn desired by the user. It should be appreciated that a user can still operate the zero turn vehicle with both hands by using the control lever arms when the handle attachment device 10 is attached to the control lever arms.

In certain embodiments, the attachment device 10 can include sensors within the grip 18 such as biometric sensors. For example, the grip 18 can include a heart rate sensor, a galvanic skin response (GSR) sensor and/or a body temperature sensor. These biometric sensors can be used to determine biological feedback of a user such as heart rate or body temperature, and can be used to predict health events such as heat stroke or dehydration of the user. In certain embodiments, the attachment device 10 can include a wireless data transmitter (e.g. Bluetooth, wifi, etc.) to communicate with a user's mobile device. In situations where the attachment device 10 predicts a health event, the attachment device 10 can transmit a notification to the user's mobile device. For example, if the attachment device 10 determines that the user is dehydrated, the attachment device 10 can send a notification to the user's device advising the user to drink water. In another example, if the attachment device 10 predicts that the user may experience heat stroke, the attachment device 10 can send a notification to the user's device advising the user to drink water and/or move to a cooler location.

The aforementioned systems, components, (e.g., handle 12, couplers 20 and 56, clamp portions 28 and 60, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

The above examples are merely illustrative of several possible embodiments of various aspects of the present innovation, wherein equivalent alterations and/or modifications will occur to others skilled in the art upon reading and understanding this specification and the annexed drawings. In particular regard to the various functions performed by the above described components (assemblies, devices, and the like), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the illustrated implementations of the innovation. In addition although a particular feature of the innovation may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the innovation, including the best mode, and also to enable one of ordinary skill in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the innovation has been described for purposes of illustrating the best mode known to the applicant at the time and enable one of ordinary skill in the art to practice the innovation, including making and using devices or systems and performing incorporated methods. The examples are illustrative only and not meant to limit the innovation, as measured by the scope and merit of the claims. The innovation has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the innovation is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A handle attachment device for operating control lever arms of a vehicle, the handle attachment device comprising:
    a handle having a first end, a grip portion, and a second end opposite the first end, wherein the grip portion is in between the first end and the second end, and a longitudinal axis extends between the first end and the second end;
    a first coupler attached to the first end, the first coupler includes a first hinged end and a first connecting end, the first hinged end is coupled to the first end of the handle such that the first coupler pivots about a first pivot axis perpendicular to the longitudinal axis;
    a second coupler attached to the second end, the second coupler includes a second hinged end and a second connecting end, the second hinged end is coupled to the second end of the handle such that the second coupler pivots about a second pivot axis perpendicular to the longitudinal axis,
    wherein the first and second couplers each include opposing legs having a leg aperture, the first and second ends of the handle each include an aperture, and the opposing legs are positioned such that each opposing leg aperture is aligned with the respective first or second end aperture therebetween.

2. The handle attachment device of claim 1, further comprising:
    a first pin extending through the opposing leg apertures of the first coupler and the first end aperture; and
    a second pin extending through the opposing leg apertures of the second coupler and the second end aperture.

3. The handle attachment device of claim 2, wherein
    the first coupler is pivotable about the first pin and the first end of the handle; and
    the second coupler is pivotable about the second pin and the second end of the handle.

4. The handle attachment device of claim 1, further comprising:
    a first clamp portion attached to the first coupler at the first connecting end, the first clamp portion is rotatable about a first rotation axis that extends through a center of the first coupler from the first connecting end to the first hinged end, wherein the first clamp portion is configured to attach to a first control lever arm of the vehicle; and
    a second clamp portion attached to the second coupler at the second connecting end, the second clamp portion is rotatable about a second rotation axis that extends through a center of the second coupler from the second connecting end to the second hinged end, wherein the second clamp portion is configured to attach to a second control lever arm of the vehicle.

5. The handle attachment device of claim 4, wherein the first rotation axis is perpendicular to the first pivot axis and the second rotation axis is perpendicular to the second pivot axis.

6. The handle attachment device of claim 4, wherein the first and second clamp portions each include a clamp connector and a lower jaw connected to the clamp connector with a clamp hinge at a first end of the lower jaw.

7. The handle attachment device of claim 6, wherein each lower jaw comprises a grip insert.

8. The handle attachment device of claim 7, wherein the grip insert is removeable by a user.

9. The handle attachment device of claim 6, wherein each lower jaw includes a notch in a second end of the lower jaw, opposite the first end of the lower jaw.

10. The handle attachment device of claim 9, wherein each of the first and second clamp portions further comprises a T-bolt pivotally attached to the clamp connector, wherein the notch is configured to receive the T-bolt, forming a clamp opening defined by the clamp connector, the lower jaw, and the T-bolt.

11. The handle attachment device of claim 10, wherein each T-bolt comprises a thumb screw and the clamp opening is adjustable by tightening or loosening the thumb screw.

12. The handle attachment device of claim 6, wherein the clamp connector of each of the first and second clamp portions are rotatably coupled to a lower face of the respective coupler with an axle extending through an upper circular face of the clamp portion and the lower face of the respective coupler.

13. The handle attachment device of claim 4, wherein at least one of the first clamp portion and the second clamp portion is extendable with respect to the respective coupler.

14. The handle attachment device of claim 1, wherein the handle is extendable along the longitudinal axis.

15. A handle attachment device comprising:
   a handle having a first end, a grip portion, and a second end opposite the first end, wherein the grip portion is in between the first end and the second end;
   a first clamp portion coupled to the first end of the handle, wherein the first clamp portion is pivotable about a first pivot axis and is rotatable about a first rotation axis;
   a second clamp portion coupled to the second end of the handle, wherein the second clamp portion is pivotable about a second pivot axis and is rotatable about a second rotation axis,
   wherein the first pivot axis and first rotation axis extend through the first end of the handle, and the second pivot axis and second rotation axis extend through the second end of the handle.

16. A handle attachment device for operating control lever arms of a vehicle, the handle attachment device comprising:
   a handle having a first end, a grip portion, and a second end opposite the first end, wherein the grip portion is in between the first end and the second end;
   a means for coupling the first end of the handle to a first control lever arm of the vehicle, wherein the means for coupling the first end of the handle is pivotable about a first pivot axis and is rotatable about a first rotation axis;
   a means for coupling the second end of the handle to a second control lever arm of the vehicle, wherein the means for coupling the second end of the handle is pivotable about a first pivot axis and is rotatable about a first rotation axis,
   wherein the first pivot axis and first rotation axis extend through the first end of the handle, and the second pivot axis and second rotation axis extend through the second end of the handle.

\* \* \* \* \*